(12) United States Patent
Wohlgemuth et al.

(10) Patent No.: US 9,461,939 B2
(45) Date of Patent: Oct. 4, 2016

(54) PROCESSING CONCURRENCY IN A NETWORK DEVICE

(71) Applicant: Marvell Israel (M.I.S.L) Ltd., Yokneam (IL)

(72) Inventors: Aron Wohlgemuth, Givat Shmuel (IL); Rami Zemach, Givat Shapira (IL); Gil Levy, Hod Hasharon (IL)

(73) Assignee: Marvell World Trade Ltd., St. Michael (BB)

( * ) Notice: Subject to any disclaimer, the term of this patent is extended or adjusted under 35 U.S.C. 154(b) by 62 days.

(21) Appl. No.: 14/517,570

(22) Filed: Oct. 17, 2014

(65) Prior Publication Data

US 2015/0113190 A1 Apr. 23, 2015

Related U.S. Application Data

(62) Division of application No. 14/516,529, filed on Oct. 16, 2014.

(60) Provisional application No. 61/918,493, filed on Dec. 19, 2013, provisional application No. 61/892,063, filed on Oct. 17, 2013.

(51) Int. Cl.
| | |
|---|---|
| H04L 12/28 | (2006.01) |
| H04L 12/935 | (2013.01) |
| H04L 12/741 | (2013.01) |
| H04L 29/06 | (2006.01) |
| G06F 9/52 | (2006.01) |
| G06F 12/02 | (2006.01) |

(52) U.S. Cl.
CPC ........... *H04L 49/3063* (2013.01); *G06F 9/524* (2013.01); *G06F 12/023* (2013.01); *H04L 45/74* (2013.01); *H04L 69/12* (2013.01); *H04L 69/22* (2013.01); *G06F 2212/163* (2013.01)

(58) Field of Classification Search
CPC ..... H04L 12/28; H04L 47/32; H04L 47/624; H04L 29/0653
See application file for complete search history.

(56) References Cited

U.S. PATENT DOCUMENTS

| | | |
|---|---|---|
| 5,764,895 A | 6/1998 | Chung |
| 7,467,406 B2 | 12/2008 | Cox et al. |
| 7,864,764 B1 | 1/2011 | Ma et al. |

(Continued)

FOREIGN PATENT DOCUMENTS

WO 99/07180 A2 2/1999

OTHER PUBLICATIONS

U.S. Appl. No. 14/574,088, Levy et al., "Increasing Packet Processing Rate in a Network Device," filed Dec. 17, 2014.

(Continued)

*Primary Examiner* — Andrew Lee

(57) ABSTRACT

A processing unit of a packet processing node initiates a transaction with an accelerator engine to trigger the accelerator engine for performing a processing operation with respect to a packet, and triggers the accelerator engine to perform the processing operation. The processing unit attempts to retrieve a result of the first processing operation from a memory location to which a result is to be written. It is determined whether the result has been written to the memory location, and when it is determined that the result has not yet been written to the memory location, the processing unit is locked until at least a portion of the result is written to the memory location.

20 Claims, 7 Drawing Sheets

(56) References Cited

U.S. PATENT DOCUMENTS

| | | |
|---|---|---|
| 7,924,860 B1 | 4/2011 | Frailong et al. |
| 8,072,974 B1 | 12/2011 | Jain et al. |
| 8,111,690 B2 | 2/2012 | Hussain et al. |
| 8,310,927 B1 | 11/2012 | Cohen |
| 2001/0004354 A1 | 6/2001 | Jolitz |
| 2001/0008713 A1 | 7/2001 | Kato et al. |
| 2001/0025315 A1 | 9/2001 | Jolitz |
| 2001/0042210 A1 | 11/2001 | Blaker et al. |
| 2004/0039939 A1 | 2/2004 | Cox et al. |
| 2004/0136368 A1 | 7/2004 | Wakayama et al. |
| 2004/0190512 A1 | 9/2004 | Schultz |
| 2006/0050694 A1 | 3/2006 | Bury et al. |
| 2006/0050722 A1 | 3/2006 | Bury et al. |
| 2006/0239194 A1 | 10/2006 | Chapell |
| 2007/0169179 A1 | 7/2007 | Narad |
| 2008/0114887 A1 | 5/2008 | Bryers et al. |
| 2008/0137855 A1 | 6/2008 | Enomoto et al. |
| 2009/0182945 A1* | 7/2009 | Aviles ............... H04L 69/16 711/122 |
| 2009/0296580 A1 | 12/2009 | Williams, Jr. et al. |
| 2010/0046640 A1 | 2/2010 | Shin et al. |
| 2010/0175073 A1* | 7/2010 | Hu ................... H04L 69/32 719/326 |
| 2010/0332613 A1 | 12/2010 | Brakensiek |
| 2011/0268119 A1* | 11/2011 | Pong ................. H04L 47/32 370/392 |
| 2011/0271059 A1* | 11/2011 | Aho .................. G06F 9/544 711/147 |
| 2012/0002546 A1 | 1/2012 | Sundararaman et al. |
| 2012/0011351 A1* | 1/2012 | Mundra ............... G06F 21/72 713/1 |
| 2012/0041998 A1* | 2/2012 | Lemoine .............. H04L 67/06 709/201 |
| 2012/0151004 A1* | 6/2012 | Pope ................. G06F 13/102 709/219 |
| 2012/0166585 A1 | 6/2012 | Kim et al. |
| 2012/0177047 A1 | 7/2012 | Roitshtein |
| 2012/0263462 A1* | 10/2012 | Koren ................ H04L 45/60 398/45 |
| 2012/0287944 A1* | 11/2012 | Pandit ................ G06F 13/28 370/474 |
| 2013/0070584 A1 | 3/2013 | Hutchison et al. |
| 2013/0080567 A1* | 3/2013 | Pope ................. G06F 13/385 709/213 |
| 2013/0152075 A1* | 6/2013 | Cardona ............. G06F 9/45558 718/1 |
| 2014/0029449 A1 | 1/2014 | Xu et al. |
| 2014/0052405 A1* | 2/2014 | Wackym ............... G01P 15/00 702/141 |
| 2014/0169378 A1 | 6/2014 | Shumsky et al. |
| 2014/0177470 A1 | 6/2014 | Roitshtein et al. |
| 2014/0192815 A1 | 7/2014 | Shumsky et al. |
| 2014/0240333 A1 | 8/2014 | Shirota et al. |
| 2015/0071079 A1 | 3/2015 | Kadosh et al. |
| 2015/0089500 A1* | 3/2015 | Kompella ............. H04L 43/18 718/1 |
| 2015/0092778 A1 | 4/2015 | Jackson et al. |
| 2015/0110113 A1 | 4/2015 | Levy et al. |
| 2015/0110114 A1 | 4/2015 | Wohlgemuth et al. |
| 2015/0172188 A1 | 6/2015 | Levy et al. |

OTHER PUBLICATIONS

U.S. Appl. No. 14/610,834, Levy et al., "Packet Distribution with Prefetch in a Parallel Processing Network Device," filed Jan. 30, 2015.

International Search Report and Written Opinion in International Application No. IB2014/002825, dated May 13, 2015 (14 pages).

U.S. Appl. No. 14/092,521, filed on Nov. 27, 2013.

U.S. Appl. No. 14/482,980, filed on Sep. 10, 2014.

Shpiner et al., "Reducing the Reordering Delay in Multi-Core Network Processors", Technical Report TR12-01, Com net, Technion, Israel, Jan. 2012, 12 pages.

Partial International Search Report in International Application No. IB14/002825, dated Feb. 23, 2015 (6 pages).

Levy, et al., "Packet Parsing and Key Generation in a Network Device," U.S. Appl. No. 14/516,500, filed Oct. 16, 2014.

Wohlgemuth, et al., "Processing Concurrency in a Network Device," U.S. Appl. No. 14/516,529, filed Oct. 16, 2014.

Non-Final Office Action for U.S. Appl. No. 14/092,521, mailed Aug. 18, 2015 (23 pages).

Notice of Allowance for U.S. Appl. No. 14/092,521, mailed Jan. 22, 2016 (8 pages).

Notice of Allowance for U.S. Appl. No. 14/516,529, mailed Feb. 10, 2016 (16 pages).

* cited by examiner

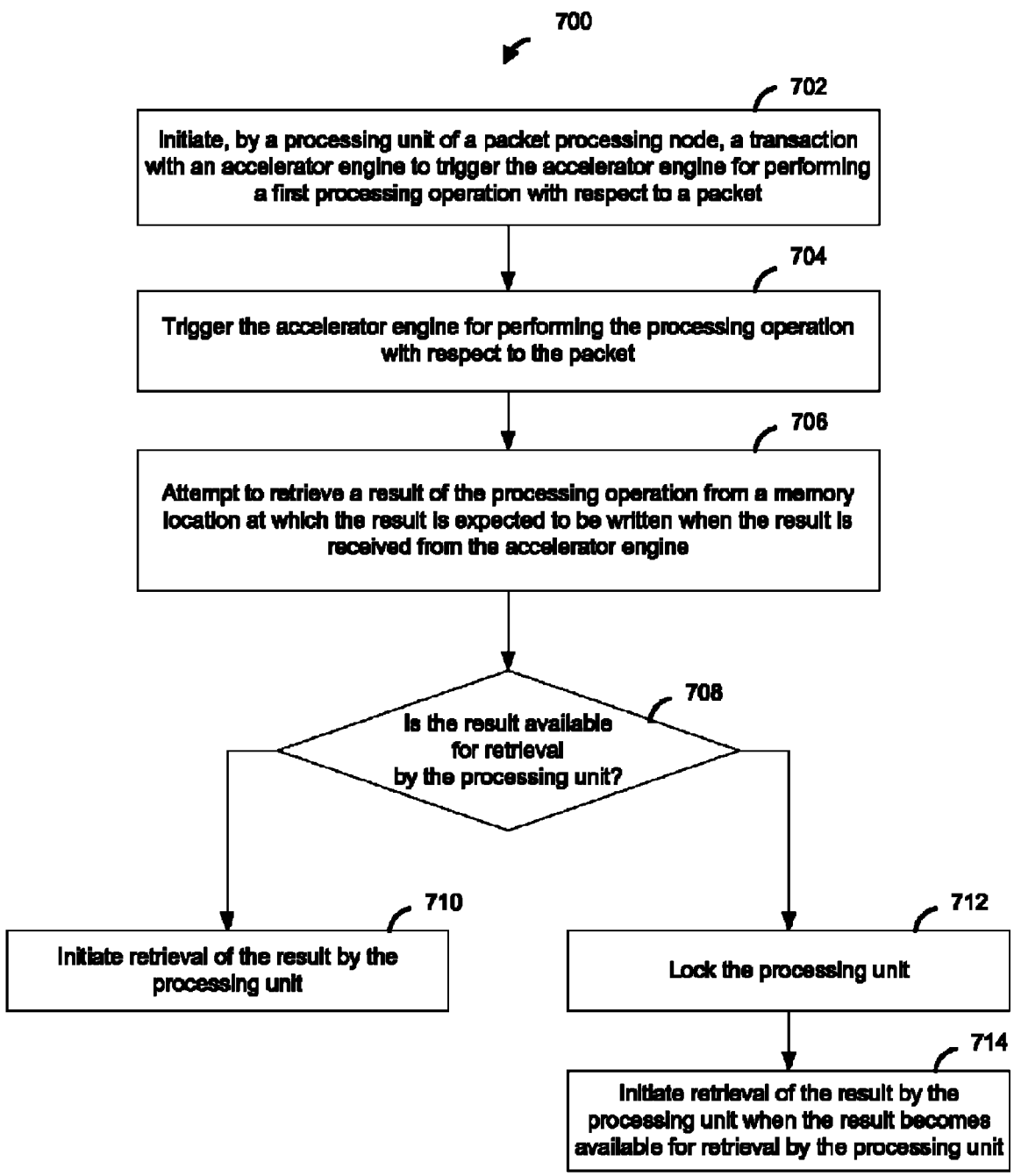

PROCESSING CONCURRENCY IN A NETWORK DEVICE

CROSS-REFERENCE TO RELATED APPLICATION

The present application is a divisional of U.S. patent application Ser. No. 14/516,529, filed Oct. 16, 2014, entitled "Processing Concurrency in a Network Device," which claims the benefit of U.S. Provisional Patent Application Nos. 61/892,063, filed Oct. 17, 2013, and 61/918,493, filed Dec. 19, 2013, both entitled "High performance processor interface to network HW accelerator (Engines)." Additionally, the present application claims the benefit of U.S. Provisional Patent Application Nos. 61/892,063, filed Oct. 17, 2013, and 61/918,493, filed Dec. 19, 2013, both entitled "High performance processor interface to network HW accelerator (Engines)." The disclosures of all of the applications referenced above are hereby incorporated by reference in their entireties.

FIELD OF THE DISCLOSURE

The present disclosure relates generally to network devices such as switches, routers, and edge devices, and more particularly to systems and methods for processing communication packets in such devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, bridges, routers, etc., employ multiple packet processing elements to simultaneously process multiple packets to provide high throughput. For example, a network device may utilize parallel packet processing in which multiple packet processing elements simultaneously and in parallel perform processing of different packets. In other network devices, a pipeline architecture employs sequentially arranged packet processing elements such that different packet processing elements in the pipeline may be processing different packets at a given time.

SUMMARY

In an embodiment, a method for processing packets in a network device that includes at least one packet processing node and a plurality of accelerator engines includes performing one or more processing operations with respect to a packet at a packet processing node. the packet processing node being configured to perform multiple different processing operations with respect to the packet. The method also includes triggering a first accelerator engine for performing a first additional processing operation with respect to the packet, wherein the first additional processing operation constitutes an operation that is different from the multiple different processing operations that the packet processing node is configured to perform. The method further includes performing the first additional processing operation by the first accelerator engine. The method additionally includes concurrently with performing the first additional processing operation at the first accelerator engine, performing at least a portion of a second additional processing operation with respect to the packet by the packet processing node, wherein the second additional processing operation is not dependent on a result of the first additional processing operation.

In another embodiment, a network device comprises a plurality of network ports configured to receive and to transmit packets on a network. The network device also comprises at least one packet processing node configured to perform multiple different packet processing operations with respect to the packets. The network device further comprises a plurality of accelerator engines, including at least a first accelerator engine configured to perform a first additional processing operation, wherein the first additional processing operation constitutes an operation that is different from the multiple different processing operations that the packet processing node is configured to perform. The at least one packet processing node is configured to perform one or more processing operations on a packet, trigger the first accelerator engine for performing the first additional processing operation with respect to the packet, and perform at least a portion of a second additional processing operation with respect to the packet concurrently with the first processing operation performed with respect to the packet by the first accelerator engine, wherein the second additional processing operation is not dependent on a result of the first additional processing operation.

In yet another embodiment, a method for processing packets in a network device that includes at least one packet processing node and a plurality of accelerator engines includes initiating, by a processing unit of the packet processing node, a transaction with a first accelerator engine to trigger the first accelerator engine for performing a first processing operation with respect to a packet. The method also includes triggering the first accelerator engine for performing the first processing operation with respect to the packet. The method further includes attempting to retrieve a result of the first processing operation from a first memory location to which the result of the first processing operation is expected to be written when the result of the first processing operation is received from the first accelerator engine. The method additionally includes in response to attempting to retrieve the result from the first memory location determining whether the result has been written to the first memory location. When it is determined that the result has been written to the first memory location, the method includes initiating retrieval of the result by the processing unit from the first memory location. When it is determined that the result has not yet been written to the first memory location, the method includes locking the processing unit until at least a portion of the result is written to the first memory location, and when at least the portion of the result has been written to the first memory location, initiating retrieval of the result by the processing unit from the first memory location.

In still another embodiment, a network device comprises a plurality of network ports configured to receive and to transmit packets on a network. The network device also comprises at least one packet processing node configured to perform multiple different packet processing operations with respect to the packets. The network device additionally comprises a plurality of accelerator engines, including at least a first accelerator engine configured to perform a first processing operation, wherein the first processing operation constitutes an operation that is different from the multiple different processing operations that the packet processing node is configured to perform. The packet processing node includes a processing unit configured to initiate a first transaction to a first accelerator engine for performing the first processing operation on a packet, and subsequently to initiating the first transaction, attempt to retrieve a result of the first processing operation from a first memory location to which the result of the first processing operation is expected to be written when the result of the first processing operation is received from the first accelerator engine. The packet processing node is configured to cause the first accelerator engine to be triggered for performing the first processing operation with respect to the packet. The packet processing node is also configured to subsequently to causing the first accelerator engine to be triggered for performing the first processing operation and in response to the attempt, by the processing unit, to retrieve the result of the first processing operation determine whether the result has been written to the first memory location. The packet processing node is further configured to, when it is determined that the result has been written to the first memory location, initiate retrieval of the result by the processing unit from the first memory location, and when it is determined that the result has not yet been written to the first memory location, lock the processing unit until at least a portion of the result is written to the first memory location, and subsequently, when at least the portion of the result has been written to the first memory location, initiate retrieval of the result by the processing unit from the first memory location.

BRIEF DESCRIPTION OF THE DRAWINGS

FIG. 7 is a flow diagram of another example method for processing a packet in a network device, according to an embodiment.

DETAILED DESCRIPTION

Figure 1:
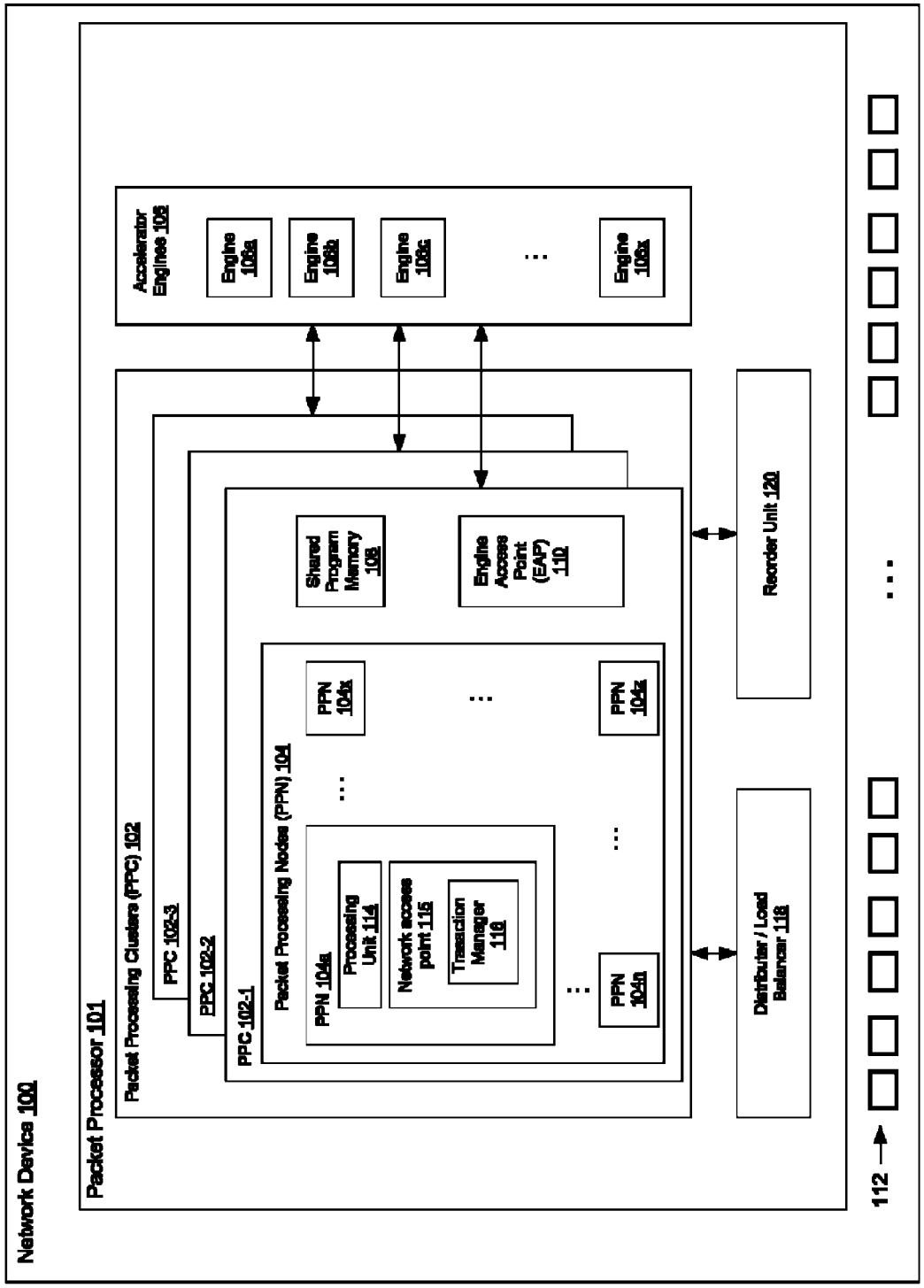
FIG. 1 is a simplified block diagram of an example network device configured to efficiently process network packets using packet processing nodes and accelerator engines, according to an embodiment.

FIG. 1 is a simplified block diagram of an example network device 100 configured to efficiently process network packets using a plurality of packet processing elements, according to an embodiment. The network device 100 is generally a computer networking device that connects two or more computer systems, network segments, subnets, and so on. For example, the network device 100 is a switch, in one embodiment. It is noted, however, that the network device 100 is not necessarily limited to a particular protocol layer or to a particular networking technology (e.g., Ethernet). For instance, the network device 100 could also be a bridge, a router, a VPN concentrator, etc.

The network device 100 includes a packet processor (or a network processor) 102, and the packet processor 101, in turn, includes a plurality of packet processing nodes (PPNs) 104, arranged in packet processing clusters (PPCs) 105, and a plurality of external processing engines 106. Although three PPCs 105 are illustrated in FIG. 1, the network device 100 includes other suitable numbers (e.g., 2, 4, 5, 6, 7, etc.) of PPCs 105 in other embodiments. Further, in some embodiments, the PPNs 104 are not arranged in packet processing clusters. The network device 100 also includes a plurality of network ports 112 coupled to the network processor 102, and each of the network ports 112 is coupled via a respective communication link to a communication network and/or to another suitable network device within a communication network. Generally speaking, the packet processor 101 is configured to process packets received via ingress ports 112, to determine respective egress ports 112 via which the packets are to be transmitted, and to transmit the packets via the determined egress ports 112.

In some embodiments, the network processor 102 processes packet descriptors associated with the packets rather than processing the packets themselves. A packet descriptor includes some information from the packet, such as some or all of the header information of the packet, and/or includes information generated for the packet by the network device 100, in an embodiment. In some embodiments, the packet descriptor includes other information as well such as an indicator of where the packet is stored in a memory associated with the network device 100. For ease of explanation, the term "packet" herein is used to refer to a packet itself or to a packet descriptor associated with the packet. Further, as used herein, the term "packet processing elements (PPEs)" and the term "packet processing nodes (PPNs)" are used interchangeably to refer to processing modules configured to perform packet processing operations on packets received by the network device 100.

In an embodiment, the network device 100 further includes a distributor module 118 and a reorder unit 120. The distributor module 118 is configured to distribute packets received via the ingress ports 112 to be processed by PPNs 104 within PPCs 105. The PPNs 104 are configured to concurrently, in parallel, perform processing of packets provided to the PPNs 104. Upon completion of processing of the packets, the PPNs 104 are configured to provide the packets to the reorder unit 120, in an embodiment. The reorder unit 120 is configured to maintain order of the packets, at least within same data flows entering the network device 100, to ensure that these packets are transmitted from the network device 100 in the order in which the packets were received by the network device 100, in an embodiment. In an embodiment, the reorder unit 120 provides the packets in an appropriate order to the appropriate egress ports 112 via which the packets are to be transmitted by the network device 100, and the network device 100 transmits the packets from the appropriate egress ports 112.

According to an embodiment, the PPNs 104 are configured to process packets using computer readable instructions stored in a non-transitory memory (e.g., the shared memory 108). In an embodiment, each PPN 104 is configured to perform all necessary processing (run to completion processing) of a packet. In another embodiment, each PPN 104 is configured to perform only a portion of processing of a packet. For example, although the packet processor 102 is illustrated in FIG. 1 as having the PPNs 104 arranged in a parallel configuration, in another embodiment the packet processor 102 includes a pipeline of PPNs 104, wherein a PPN 104 in the pipeline is configured to perform a portion of processing of a packet and to pass the packet to a next PPN 104 in the pipeline for performing another portion of processing of the packet. The external processing engines 106 are implemented using application-specific integrated circuits (ASICs) or other suitable hardware components, and each external processing engine 106 is dedicated to performing a single, typically processing intensive operation, in an embodiment. During processing of the packets, the PPNs 104 are configured to engage the external engines 106 for performing certain processing operations with respect to the packets. As just an example, in an example embodiment, a first external processing engine 106 (e.g., the engine 106a) is a forwarding lookup engine, a second external processing engine 106 (e.g., the engine 106x) is a policy lookup engine, a third external processing engine 106 (e.g., the engine 106n) is a cyclic redundancy check (CRC) calculation engine, etc. During processing of the packets, the PPNs 104 are configured to selectively engage the external processing engines 106 for performing the particular processing operations on the packets. In at least some embodiments, the PPNs 104 are not configured to perform the particular processing operations that the external processing engines 106 are configured to perform. The particular processing operations that the external processing engines 106 are configured to perform are typically highly resource intensive and/or would require a relatively longer time to be performed if the operations were performed using a more generalized processor, such as a PPN 104, in at least some embodiments and/or scenarios. In at least some embodiments and scenarios, it would take significantly longer (e.g., twice as long, ten times as long, 100 times as long, etc.) for a PPN 104 to perform a processing operation that an external processing engine 106 is configured to perform. As such, the external processing engines 106 assist PPNs 104 by accelerating at least some processing operations that would take a long time to be performed by the PPNs 104, in at least some embodiments and/or scenarios. Accordingly, the external processing engines 106 are sometimes referred to herein as "accelerator engines." The PPEs 104 are configured to utilize the results of the processing operations performed by the external processing engines 106 for further processing of the packets, for example to determine certain actions, such as forwarding actions, policy control actions, etc., to be taken with respect to the packets, in an embodiment.

In an embodiment, when a PPN 104 engages an accelerator engine 106 for performing a particular processing operation with respect to a packet, the PPN 104 continues processing of the packet and performs one or more additional processing operations with respect to the packet concurrently with the particular processing operation performed at the accelerator engine 106. In at least some embodiments, the PPN 104 is configured to support multiple concurrently pending transactions, or requests, to the accelerator engines 106 during processing of a packet. In an embodiment, to efficiently manage responses, corresponding to concurrently pending requests to the accelerator engines 106, the PPN 104 assigns a respective identification numbers (IDs) to each transaction upon initiation of the transaction, and to subsequently use and ID assigned to a particular transaction to determine that the a response to the particular transaction has been received by the PPN 104. Managing responses corresponding to multiple concurrently pending transactions using respective IDs assigned to the transactions upon initiation of the transactions allows the PPN 104 to quickly and efficiently determine that a result corresponding to a particular transaction has been received by the PPN and is available to be used for further processing of the packet at the PPN.

In an embodiment, each PPN 104 includes a respective processing unit 114 and a network access point 115. The processing unit 114 is configured to perform processing operations with respect to packets by executing computer readable instructions stored in the shared memory 108, in an embodiment. In an embodiment, the processing unit 114 is a suitable microprocessor. In another embodiment, the processing unit 114 is a suitable processing unit other than a microprocessor. During processing of a packet, the processing unit 114 initiates transactions with the accelerator engines 106 to trigger the accelerator engines 106 for performing processing operations with respect to the packet, and the network access point 115 causes appropriate accelerator engines 106 to be triggered for performing the processing operations, in an embodiment. The network access point 115 includes a transaction manager 116 configured to assign IDs corresponding to the transactions initiated by the processing unit 114, and to provide the IDs to the processing unit 114. The processing unit 114 is configured to subsequently use the IDs to obtain results of the corresponding transactions when the results become available to be obtained by the processing unit 114, in an embodiment.

According to an embodiment, to initiate a transaction with an accelerator engine 106, the processing unit 114 issues a load command to the network access point 115. The load command indicates, to the network access point 115, a particular processing operation to be performed with respect to the packet by the accelerator engine 106. In response to issuing the load command, the processing unit 114 loads, from the transaction manager 116, an ID assigned by the transaction manager 116 to the initiated transaction, in an embodiment. Initiating a transaction using a load command allows the processing unit 114 to receive an ID corresponding to the request concurrently (e.g., during a same clock cycle) with the initiation of the transaction, in an embodiment. In an embodiment, when the processing unit 114 attempts to obtain a result of a particular processing operation, the processing unit 114 issues a load command to the transaction manager 116, and includes, in an address field of the load command, the channel ID assigned to the corresponding transaction.

The network access point 115 utilizes the channel ID to determine whether the result of the transaction is available to be obtained by the processing unit 114, in an embodiment. When the network access point 115 determines that the result of the transaction is available to be obtained by the processing unit 114, the network access point 115 causes the result to be provided to the processing unit 114. On the other hand, if the network access point 115 determines that the result of the transaction is not yet available to be obtained by the processing unit 114 (e.g., when the result has not yet been received from the accelerator engine 106 that was triggered to perform the requested processing operation), the network access point 115 locks the processing unit 114 until at least a portion of the result of the transaction becomes available to be obtained by the processing unit 114, in an embodiment. Subsequently, when at least a portion of the result of the transaction becomes available to be obtained by the processing unit 114, the network access point 115 unlocks the processing unit 114 by providing the result of the transaction to the processing unit 114, in an embodiment.

As will be described in more detail below, initiating, during processing of a packet by a PPN 104, concurrently pending transactions with accelerator engines 106, performing processing operations on the packet at the PPN 104 concurrently with processing operations performed with respect to the packet by the accelerator engines 106, assigning IDs to the initiated transactions, using load commands to initiate the transactions, and/or using load commands and the assigned IDs to subsequently retrieve results of the transactions generally improve efficiency of processing of a packet and reduce latency associated with processing of the packet, in various embodiments and scenarios.

Figure 2:
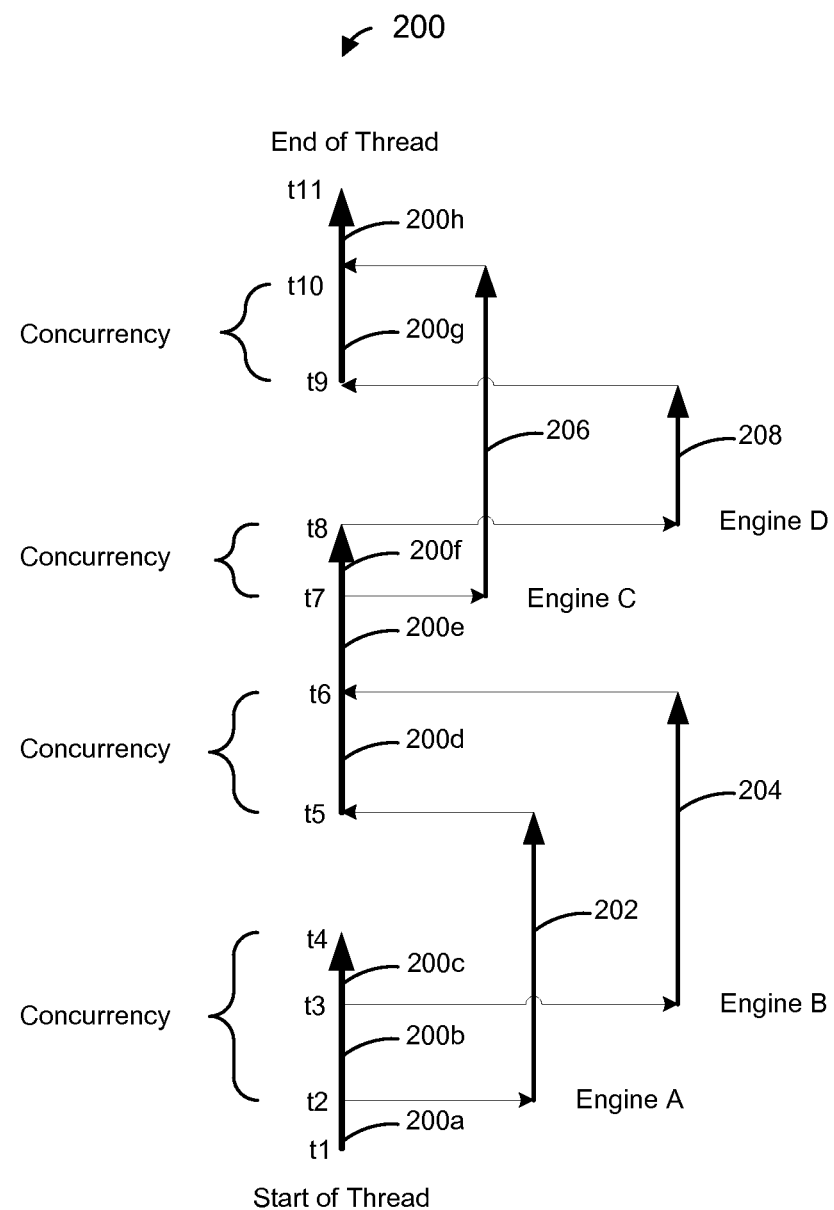
FIG. 2 is a diagram illustrating an exemplary processing thread that is executed by a packet processing node of FIG. 1, according to an embodiment.

FIG. 2 is a diagram illustrating an example of a processing thread 200 that is executed by a packet processing node 104 (e.g., the PPN 104*a*) of FIG. 1 to process a packet, according to an embodiment. In an embodiment, the thread 200 is executed by the processing unit 114 of the PPN 104*a*. For illustrative purposes, the example processing thread 200 is discussed as being executed by a PPN 104 of the network device 100 of FIG. 1. In other embodiments, however, the example processing thread 200 is executed by a suitable processing element other than a PPN 104 and/or in a suitable device other than the example network device 100 of FIG. 1.

In an embodiment, the processing thread 200 includes a set of computer readable instructions that the PPN 104 executes to process a packet. The PPN 104 begins execution of the thread 200 at a time t1 by executing one or more instructions of the thread 200 corresponding to a portion 200*a* of processing of the packet. In an embodiment, the portion 200*a* includes performing one or more processing operations with respect to the packet. At a time t2, after performing the portion 200*a* of processing of the packet, the PPN 104 triggers a first accelerator engine A for performing a processing operation 202 with respect to the packet. With reference to FIG. 1, in an example embodiment, the first accelerator engine A triggered at the time t2 is the accelerator engine 106*a*, and the processing operation 202 is, for example, a forwarding lookup operation for the packet. After triggering the accelerator engine A, and before receiving a result of the processing operation 202 from the accelerator engine A, the PPN 104 continues processing of the packet, and executes one or more instructions corresponding to a portion 200*b* of processing of the packet, in an embodiment. In an embodiment, the portion 200*b* includes performing one or more processing operations, with respect to the packet, that are independent of the result of the processing operation 202 triggered at the time t2. As illustrated in FIG. 2, the portion 200*b* of processing of the packet is performed by the PPN 104 with a portion of the processing operation 202 performed with respect to the packet by the first accelerator engine A, in an embodiment.

Continuing with FIG. 2, at a time t3, the PPN 104 triggers a second accelerator engine B for performing a processing operation 204 with respect to the packet. With reference to FIG. 1, in an example embodiment, the second accelerator engine B triggered at the time t3 is the accelerator engine 106*b*, and the processing operation 204 is, for example, a policy lookup operation for the packet. In an embodiment, after triggering the accelerator engine B, and before receiving a result of the processing operation 204 from the accelerator engine B, the PPN 104 continues processing of the packet, and executes one or more instructions corresponding to a portion 200*c* of processing of the packet. In an embodiment, the portion 200*c* includes performing one or more processing operations, with respect to the packet, that are independent of the result of the processing operation 204 triggered at the time t3. As illustrated in FIG. 2, the portion 200*b* of processing of the packet is performed by the PPN 14 concurrently with a portion of the processing operation 202 performed with respect to the packet by the accelerator engine A and a portion of the processing operation 204 performed with respect to the packet by the accelerator engine B, in an embodiment.

At a time t4, the PPN 104 suspends processing of the packet. For example, the PPN 104 can no longer process the packet without receiving the result of the processing operation 202 from the accelerator engine A and/or the result of the processing operation 204 from the accelerator engine B, in an embodiment. At a time t5, the PPN 104 receives a response from the accelerator engine A, the response containing the result of the processing operation 202 performed by the accelerator engine A. Upon receiving the response at t5, the PPN 104 resumes processing of the packet, and executes one or more instructions corresponding to a portion 200*d* of processing of the packet. In an embodiment, the portion 200*d* includes performing one or more processing operations based on the result of the processing operation 202 received from the first accelerator engine A. As illustrated in FIG. 2, the portion 200*d* of processing of the packet is performed by the PPN 104 concurrently with a portion of the processing operation 204 performed with respect to the packet by the accelerator engine B. At a time t6, the PPN 104 receives a response from the accelerator engine B, the response containing the result of the processing operation 204 performed by the accelerator engine B. In an embodiment, after receiving the response from the accelerator engine B, the PPN 104 performs one or more processing operation with respect to the packet based on the result of the processing operation 204 received from the accelerator engine B. At a time t7, after performing the portion 200*e* of processing of the packet, the PPN 104 engages a third accelerator engine C for performing a processing operation 206 with respect to the packet. In an example embodiment, the third accelerator engines C is the accelerator engine 106*c* of FIG. 1, and the processing operation 206 is, for example, a longest prefix match lookup for the packet. The PPN 104 continues processing of the packet by executing instructions corresponding to a portion 200*f* of processing of the packet until a time t8, at which the PPN 104 engages a fourth accelerator engine D for performing a processing operation 208 with respect to the packet. At the time t8, the PPN 104 suspends processing of the packet. The portion 200*f* of processing of the packet is performed on the packet by the PPN 104 concurrently with a portion of the processing operation 206 performed with respect to the packet by the accelerator engine C, in an embodiment.

At a time t9, the PPN 104 receives a response from the accelerator engine D, the response containing the result of the processing operation 208 performed by the accelerator engine D. In this case, although the accelerator engine C was triggered by the PPN 104 at an earlier time relative to triggering of the accelerator engine D, the PPN 104 receives the response form the accelerator engine D prior to receiving a response from the accelerator engine C, in the illustrated embodiment. In an embodiment, after receiving the response from the accelerator engine D at the time t9, the PPN 104 resumes processing of the packet, and performs one or more processing operations corresponding to a portion 200*g* of processing of the packet. In an embodiment, the portion 200*g* of processing of the packet is performed on the packet at the PPN 104 concurrently with a portion of the processing operation 206 performed with respect to the packet by the accelerator engine C. At a time t10, the PPN 104 receives a response from the accelerator engine C, the response containing the result of the processing operation 206 performed by the accelerator engine C. The PPN 104 continues processing of the packet by executing one or more instructions corresponding to a portion 200h of processing of the packet. In an embodiment, the portion 200h of processing of the packet includes performing one or more operations on the packet based on the result of the processing operation 206 received from the accelerator engine C. At a time t11, the PPN 104 completes processing of the packet.

Performing at least some processing of the packet by the PPN 104 concurrently with at least portions of processing operations performed with respect to the packet by the accelerator engines A, B, C and D generally reduces processing time of the packet by the network device 100, thereby reducing latency associated with processing of the packet by the network device 100, in at least some embodiments. Reducing processing time of each packet processed by the network device 100 allows the network device to process more packets during a given time and/or allows the network device 100 to process a given number of packets during a given period of time using fewer PPNs 104, in at least some embodiments.

Figure 3:
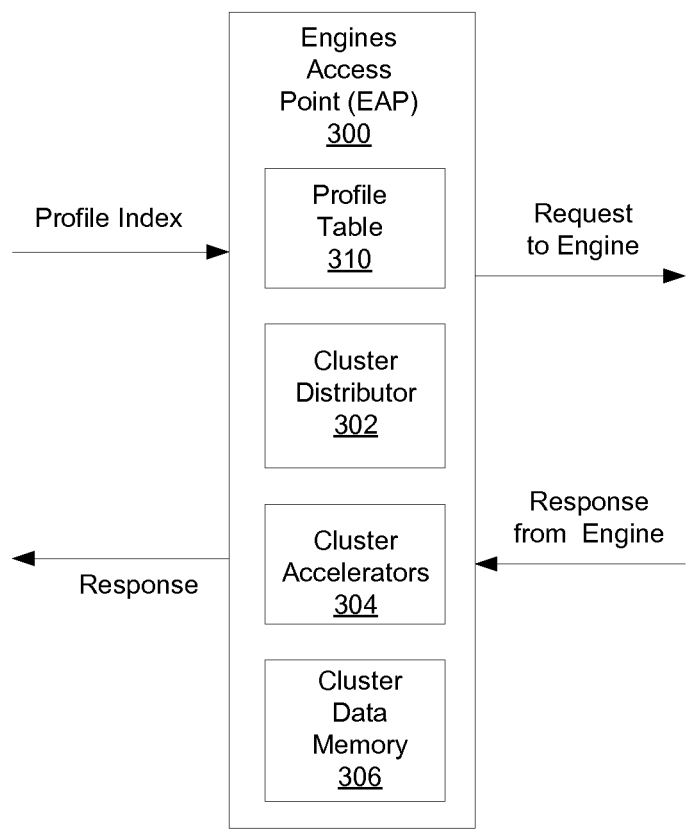
FIG. 3 is a block diagram of an engine access point used with the network device of FIG. 1, according to an embodiment

FIG. 3 is a block diagram of an engine access point (EAP) 300 utilized with the network device 100 of FIG. 1, according to an embodiment. In an embodiment, the EAP 300 is used as the EAP 110 of FIG. 1. For illustrative purposes, the example EAP 300 is discussed with reference to the network device 100 of FIG. 1. In other embodiments, however, EAP 300 is utilized in a suitable network device different than the example network device 100 of FIG. 1.

In an embodiment, the EAP 300 corresponds to a packet processing cluster and is coupled to PPNs 104 included in the packet processing cluster. The EAP 300 includes a cluster distributor unit 302, cluster accelerator engines 304 and cluster data memory 306, in an embodiment. The cluster distributor is configured to distribute processing of packets provided to the packet processing cluster by the distributer 118, and to distribute processing packets among available PPNs 104 in the cluster. The cluster accelerator engines 304 include one or more accelerator engines that are local to the cluster. The accelerator engines 304 are generally similar to the accelerator engines 106 except that use of the accelerator engines 304 is limited to PPNs 104 within the cluster, in an embodiment. In an embodiment, the accelerator engines 304 are configured to perform processing operations that do not require memory accesses and/or memory lookups, while the accelerator engines 106 perform processing operation that require memory accesses and/or memory lookups. For example, the cluster accelerator engines 304 are configured to perform such operations as cyclic redundancy check calculations and/or other calculations with respect to packets being processed in the cluster 102-1, in an embodiment. As used herein, the terms "accelerator engine" and "external accelerator engine" encompass the external accelerator engines 106 as well as the cluster accelerator engines 304.

The cluster data memory 306 stores information common to the PPNs 104 in the cluster 102-1, in an embodiment. For example, the data memory 306 stores configuration information common to the PPNs 104 in the cluster 102-1, in an embodiment. In an embodiment, the cluster data memory 306 also stores packets provided to the cluster 102-1 by the distributor 118 until processing of the packets is distributed to the PPNs 104 by the cluster distributor 302, in an embodiment. The cluster data memory also stores results of processing operations performed with respect to packets being processed by the PPNs 104 until the results are provided to the PPNs 104 that requested the processing operations, in an embodiment.

Figure 4:
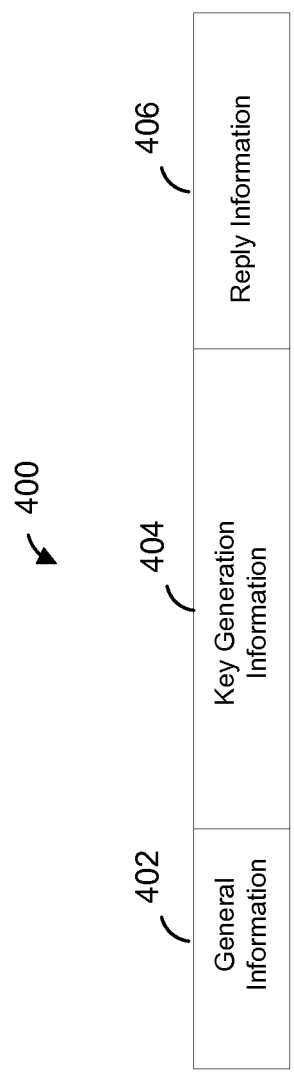
FIG. 4 is a diagram of an example entry of an accelerator engine request profile table utilized by the engine access point of FIG. 3, according to an embodiment.

In an embodiment, the EAP 300 includes a profile table 310. The profile table 310 includes a plurality of entries that include information for handling transactions for particular processing operations. For example, entries of the profile table 310 include information for generating requests, to be sent to accelerator engines 106, for performing the particular processing operations, in an embodiment. Referring briefly to FIG. 4, an example entry 400 of the profile table 310 includes information for handling a transaction for a particular type of processing operation, for example a forwarding lookup operation. The profile entry 400 includes a general information field 402, a key generation information field 404, and a reply information field 406. The general information field 402 includes general information about the transaction, such as, for example, an identifier of an accelerator engine 106 configured to perform the particular type of processing operation requested by the transaction. The key generation field 404 includes information for generating a key corresponding to a particular packet, such as which header fields and/or other data associated with the packet to include in the key. The reply information field 406 indicates where to store a result of the processing operation when the result is received at the EAP 300. For example, in an embodiment, the response field indicates an address of a memory location, such as a memory location in a local memory of the PPN 104 that initiated the transaction at which the result of the processing operation is to be stored when the result is received at the PPN 104.

Referring back to FIG. 3, in an embodiment, to trigger an accelerator engine 106 for performing a particular processing operation with respect to a packet, a PPN 104 provides, to the EAP 300, an indication of the particular processing operation. For example, the PPN 104 provides, to the EAP 300, an index of an entry in the profile table 310 that corresponds to the particular processing operation. The EAP 300 receives the indication of the particular processing operation and accesses the profile table 310 based on the indication (e.g., using the indication as an index into the profile table 310), and retrieves, from the profile table 310, information needed to handle a transaction with the accelerator engine 106. Then, based on the information retrieved from the entry in the profile table 310, the EAP 300 generates a request for the processing operation, and directs the request to an appropriate accelerator engine 106 for performing the processing operation. The EAP 300 is also configured to receive a response of the transaction from the accelerator engine 106 that performed the processing operation with respect to the packet, the response containing the result of the processing operation. When the EAP 300 receives a result of the transaction, the EAP 300 causes the result of the processing operation to be written to a memory location indicated in the entry in the profile table 310, in an embodiment.

Figure 5:
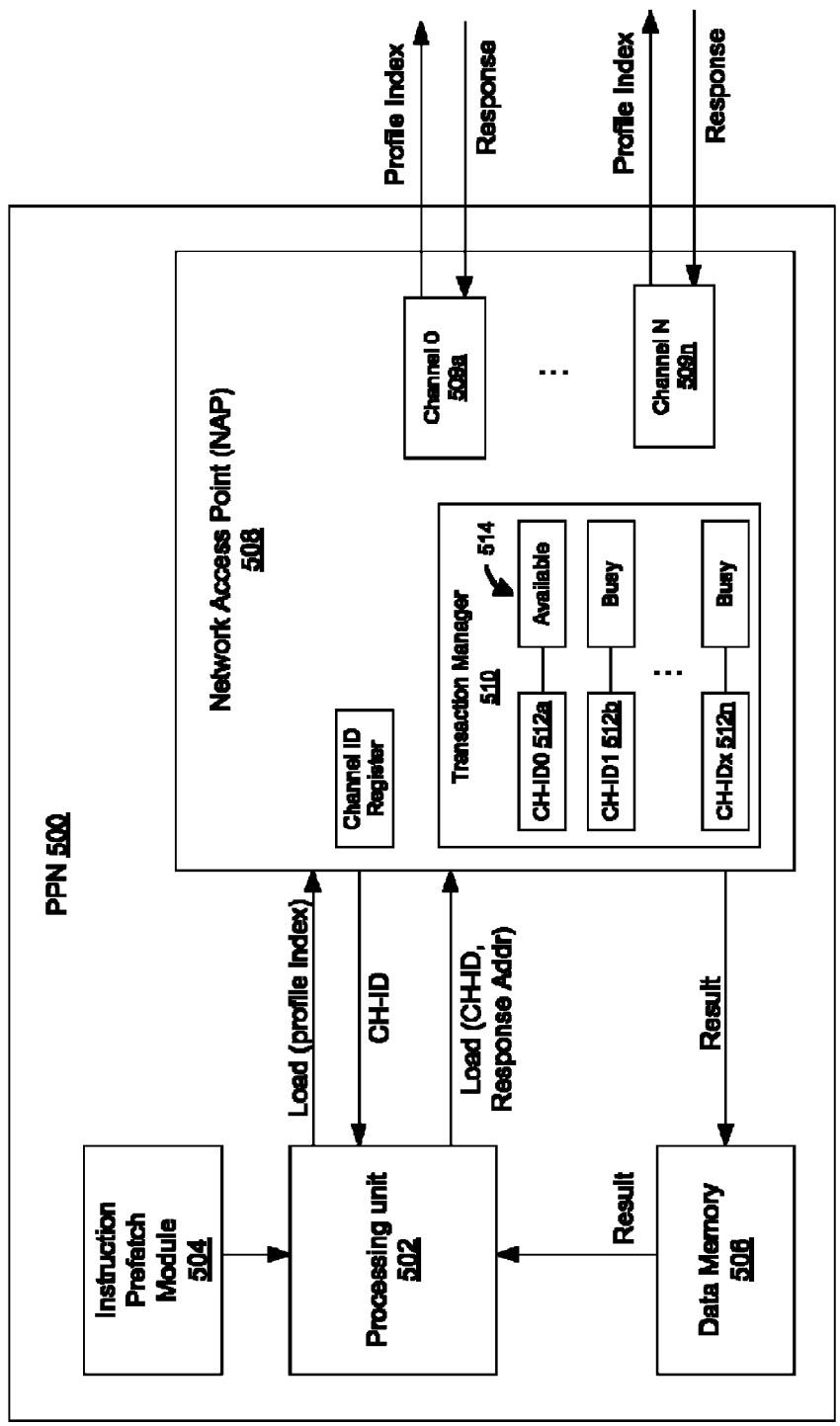
FIG. 5 is a block diagram of a packet processing node that is utilized in the network device of FIG. 1, according to an embodiment

FIG. 5 is a block diagram of a PPN 500 that is utilized as one of the PPNs 104 in the network device 100 of FIG. 1, according to an embodiment. For illustrative purposes, the example PPN 500 is discussed with reference to the network device 100 of FIG. 1. In some embodiments, however, PPN 500 is utilized in a suitable network device different than the example network device 100 of FIG. 1.

The PPN 500 includes a processing unit 502 coupled to an instruction prefetch module 504, a data memory 506 and a network access point (NAP) module 508. In an embodiment, the processing unit 502 is a processing device configured to perform packet processing operations selected from among a set of packet processing operations. In an embodiment, the processing unit 502 is a microprocessor. In another embodiment, the processing unit 502 is a suitable processing unit other than a microprocessor. In an embodiment, the processing unit 502 corresponds to the processing unit 114 of FIG. 1. In another embodiment, the processing unit 502 is a suitable processing unit different than the processing unit 114 of FIG. 1.

In an embodiment, the packet processing unit 502 performs packet processing operations by executing computer readable instructions stored in a non-transitory memory, such as the shared program memory 108. The instruction prefetch module 504 is configured to load, or "prefetches," sets of instructions from the memory 108, and the processor module 502 operates by executing the prefetched instructions. Prefetching sets of instructions allows the processing unit 502 to execute the instructions more quickly compared to systems in which a processing unit reads instructions directly from the memory that stores the instructions, in at least some embodiments. In another embodiment, however, the PPN 500 omits the prefetch module 504, and the processor module 502 operates by reading instructions directly from the memory 108.

The data memory 506 stores information needed for processing of a packet being processed by the PPN 500, in an embodiment. For example, the data memory 506 stores a packet descriptor corresponding to the packet being processed by the PPN 500, in an embodiment. Additionally, the data memory 506 stores data generated for the packet during processing of the packet by the network device 100, in an embodiment. The data generated for the packet during processing of the packet by the network device 100 is subsequently used by the processing unit 502 for further processing of the packet based on such data, in an embodiment. For example, the data memory 506 stores results of processing operations performed by accelerator engines 106 when the results are received by the PPN 500 from the accelerator engines 106, in an embodiment.

The NAP 508 is configured to interface with the processing unit 502 and with the EAP 300 to trigger accelerator engines 106 for performing processing operations, with respect to a packet, requested by the processing unit 502, according to an embodiment. For example, when the processing unit 502 initiates a transaction for a particular processing operation, the NAP 508 sends an indication of the particular processing operation to the EAP 300. The EAP 300 then accesses the profile table 310 using the indication of the particular processing operation as an index into the profile table 310, and generates a request for the particular processing operation based on information retrieved from the profile 310, in an embodiment. In effect, the processing unit 502 offloads generation of the request for the processing operation to the EAP 300, in an embodiment. In an embodiment, after initiating a transaction, the processing unit 502 continues processing of the packet. In an embodiment, the processing unit 502 performs one or more processing operation on the packet concurrently with generates of the request for the particular processing operation to be performed with respect to the packet by an accelerator engine 106, in an embodiment. In an embodiment, the NAP 508 is also configured to receive results of the processing operations performed by the accelerator engines 106, and to provide the results to the processing unit 502.

According to an embodiment, the NAP 508 supports multiple parallel, or concurrently pending, transactions initiated by the processing unit 502. The NAP 508 includes a plurality of channels 509 for conducting multiple parallel transactions with the accelerator engines 106, and a transaction manager 510 for managing the transactions. The transaction manager 510 is configured to assign channel identifiers (IDs) 512 to transactions initiated by the processing unit 502, and to provide the assigned channel IDs to the processing unit 502. The processing unit 502 is configured to subsequently use channel IDs assigned to the transactions to obtain the results of the processing operations corresponding to the transactions, in an embodiment.

In an embodiment, to initiate a transaction for a particular processing operation, the processing unit 502 provides, to the NAP 508, an indication of the particular processing operation. For example, the processing unit 502 provides, to the processing unit 502, an indication (e.g., an index) of an entry in a profile table, such as the profile table 310, corresponding to the particular processing operation. In an embodiment, the processing unit 502 initiates a transaction, and provides the indication of the particular processing operation requested by the transaction, by issuing a load command to the NAP 508, and including the indication of the particular processing operation in an address field of the load command. In response to issuing the load command, the processing unit 502 loads a channel ID, corresponding to the transaction, from the NAP 508. For example, the NAP 508 includes a channel register 514, in an embodiment. The NAP 508 populates the register 514 with an available channel ID. In response to issuing a load command to initiate a transaction, the processing unit 502 loads the channel ID from the channel register 514 and associates the channel ID with the transaction, in this embodiment.

Using a load command for initiating a request allows the processing unit 502 to concurrently, e.g., in the same clock cycle, initiate the transaction by providing an indication of the requested processing operation to the NAP 508, and receive a channel ID for the transaction from the NAP 508, in an embodiment. Initiating a transaction and receiving a channel ID corresponding to the transaction during a same clock cycle eliminates any additional clock cycles for providing a channel ID to the processing unit 502 that would be needed if, for example, a write command was using to initiate the transaction, in at least some embodiments. Further, in at least some embodiments, according to an instruction pipeline architecture of the processing unit 502, a load, or a read, instruction is issued at an earlier stage in the pipeline architecture relative to, for example, a store, or a write, instruction. In such embodiments, using a load command to initiate a transaction, instead of using, for example, a write command to initiate the transaction, results in the command being issued during an earlier clock cycle of the processing unit 502.

Thus, in at least some embodiments, using a load (or read) command, rather than, for example a store (or write) command, to initiate transactions during processing of a packet reduces latency associated with processing of the packet due to one or both of (i) receiving, at the processing unit 502, a channel ID corresponding to the transaction concurrently with initiation of the transaction by the processing unit 502, and (ii) earlier initiation of the transaction according to the instruction pipeline architecture of the processing unit 502. In at least some embodiments, reduction of latency associated with processing of a packet is significant, particularly when multiple transactions are initiated during processing of the packet. Reducing latency associated with processing of each packet by the PPN 500, in turn, allows the PPN 500 to process a greater number of packets in a given period of time (e.g., by increasing a number of parallel processing contexts handled by the PPN 500 in the given period of time) and/or reduces the number of packet processing nodes needed by the network device 100 to support a given maximum latency introduced into traffic by the network device 100. Reducing the number of packet processing nodes in the network device 100, in turn, reduces the area occupied by the packet processor 102 and power consumed by the packet processor 102 of the network device 100, in at least some embodiments.

In some embodiments, according to an instruction pipeline architecture of the processing unit 502, the processing unit 502 issues speculative loads in some situations. In some situations, the processing unit 502 issues a speculative load command, and by issuing a speculative load command, unintentionally initiates a transaction. The processing unit 502 is configured to terminate a transaction if the transaction was unintentionally initiated by the processing unit 502 via a speculative load command, in at least some embodiments.

In an embodiment, each channel ID 512 in the transaction manager 510 is associated with a status 514. When a channel ID 512 is assigned to a transaction, the transaction manager 510 "locks" the channel ID by setting the status 514 associated with the assigned channel ID 512 to indicate that the channel ID is "busy." Subsequently, when a result of the processing operation is received by the PPN 500 and at least partially written to the data memory 506 of the PPN 500, the transaction manager 510 releases the channel ID 512 by updating the status 514 associated with the channel ID 512 to indicate that the channel ID 512 is "available." In this embodiment, the busy status 514 of a channel ID 512 assigned to a transaction indicates that the channel ID 512 is locked, and that a result of the transaction is not yet available for retrieval by the processing unit 502. On the other hand, the available status 514 of a channel ID 512 assigned to a transaction indicates that the channel ID 512 is released, and that the result of the transaction is available for retrieval by the processing unit 502.

In an embodiment, when the processing unit 502 attempts to retrieve a result of a particular transaction, the processing unit 502 issues a load command to the NAP 508, wherein the load command indicates, in an address field of the load command, (i) the channel ID corresponding to the transaction and (ii) the address of the memory location in the data memory 506 from which to retrieve the result of the transaction. In an embodiment, the processing unit 502 prepends the channel ID corresponding to the transaction to the address of the memory location from which the result of the transaction is to be retrieved, and provides the channel ID prepended to the address of the memory location to the NAP 508. For example, the address field of the load command includes the channel ID prepended to the address of the memory location, in an embodiment. Accordingly, one or more of the most significant bits (MSBs) of the address field of the load command correspond to the channel ID of the transaction, and the remaining, or least significant bits (LSBs) correspond to the address of a memory location, in the data memory 506, from which the result of the corresponding processing operation is to be retrieved, in this embodiment.

The NAP 508 receives the load command and determines, based on the channel ID indicated in the address field of the load command, whether the result of the corresponding processing operation is available for retrieval from the data memory 506, in an embodiment. In an embodiment, the NAP 508 maps the channel ID indicated in the load command to a channel ID 512, and checks the status 514 associated with the channel ID 512. If the status 514 of the channel ID 512 is set to available, indicating that the result of the then the NAP 508 initiates transfer of the result from the memory location indicated in the load command to the processing unit 502. The processing unit 502 reads the result, and continues processing of the packet based on the result, in an embodiment. On the other hand, if the status 514 indicates that the channel ID 512 is currently busy, then the NAP 508 does not imitate the transfer until the state 514 of the channel ID 512 is updated to indicate that the channel ID 512 is available. Because the processing unit 502 issued a load command, but has not received data requested by the load command, the processing unit 502 is forced to wait until the result of the processing operation becomes available for retrieval by the processing unit 502. In effect, by not initiating the transfer from the data memory 506, the NAP 508 "locks" the processing unit 502 and processing of the packet by the processing unit 502 is suspended, in an embodiment. Thus, by issuing a load command to initiate retrieval of the result of the transaction, the processing unit 502 automatically suspends processing of the packet if the result of the transaction is not yet available to the processing unit 502, in this embodiment. Then, when the status 514 of the channel ID 512 is updated to indicate that the channel ID 512 is available (i.e., when the result of the transaction becomes available in the data memory 506), the NAP 508 initiates transfer of the result from the data memory 506. Accordingly, the data requested by the load command (i.e., the result of the processing operation) is loaded by the processing unit 502, and the processing unit 502 is "unlocked," in an embodiment. The processing unit 502 then resumes processing of the packet based on the retrieved result of the processing operation, in an embodiment.

In an embodiment, the NAP 508 is configurable to operate in full lock mode or semi-lock mode. In the full-lock mode, the NAP 508 releases a channel ID 512 assigned to a transaction when an entire response to the transaction has been received at the PPN 500 and the entire result of the processing operation has been entirely written to the data memory 506. Accordingly, in this embodiment, if the processing unit 502 gets locked on an attempt to retrieve the result of the processing operation from the data memory 506, operation of the processing unit 502 resumes when the entire result is available for retrieval from the data memory 506. In the semi-lock mode, on the other hand, the NAP 508 releases a channel ID assigned to a transaction when only a portion of a response to the transaction has been received and/or only a portion of a result of the transaction has been written to the data memory 506. For example, the NAP 508 releases a channel ID assigned to a transaction after a first segment of data corresponding to the response has been received by the PPN 500 and/or after the first segment had been written to the data memory 506. In this case, if the processing unit 502 gets locked on an attempt to retrieve the result of the transaction from the data memory 506, operation of the processing unit 502 resumes after only a portion (e.g., a first segment) of the result of the processing operation is available for retrieval from the data memory 506. In an embodiment, in this case, the available portion of the result is loaded by the processing unit 502. The processing unit 502 then begins processing of the packet based on the retrieved portion of the result, in an embodiment. The semi-lock mode is useful in at least some situations in which receiving a result of a transaction and/or writing the result of the transaction to the data memory 506 is performed over more than one clock cycle. For example, in case of a transaction to a packet distribution engine 106, for a new packet to be distributed to the PPN 500, the response to the transaction includes loading a header of a new packet and/or a packet descriptor corresponding to a new packet, in an embodiment. The header and/or the packet descriptor of the new packet may take several clock cycles to be received by the PPN 500 and/or written to the data memory 506, in this embodiment. To allow the processing unit 502 to begin performing processing of the packet before the entire response is received by the PPN 500 and/or written to the data memory 506, the NAP 508 is configured to operate in semi-lock mode in this case, in an embodiment.

In an embodiment, the transaction manager 510 is configured to release a channel ID 512 assigned to a transaction automatically when the result of the transaction, or a portion of the result of the transaction, becomes available for retrieval from the data memory 506. For example, the transaction manager 510 is configured release the channel ID 512 without instruction to do so from the processing unit 502. Accordingly, when the processing unit 502 attempts to retrieve a result of a transaction from the data memory 506, if the result of the transaction is already available for retrieval from the data memory 506, the result is automatically, during the same clock cycle, provided to the processing unit 506, in an embodiment. In this embodiment and scenario, (i) issuing a load command to obtain a result of a transaction (ii) determining that the result of the transaction is available in the data memory 506 and (iii) initiating the transfer of the result to the processing unit 502 is all performed during a same clock cycle. Further, if a result of a transaction is not yet available when retrieval of the result is attempted by the processing unit 502, and the processing unit 502 is locked while waiting for the result to become available, the result is provided to the processing unit 502 automatically when the result becomes available in the data memory 502, e.g., during the same clock cycle that the result becomes available. Accordingly, in this embodiment and scenario, (ii) determining that the result of the transaction is available in the data memory 506 and (iii) initiating the transfer of the result to the processing unit 502 occurs during a same clock cycle.

In an embodiment, the number of channel IDs 512 in the transaction manager 512 corresponds to the number of channels 509 in the NAP 508, and accordingly, to the number of concurrently pending requests supported by the NAP 508. In this embodiment, because the transaction manager 510 releases a channel ID corresponding to a transaction automatically when a result of the transaction becomes available in the data memory 506, the transaction memory 510 can release an channel ID assigned to a transaction A, and reassign the channel ID to a subsequent transaction B, before the the result of the transaction A is retrieved by the processing unit 502. In this case, when the processing unit 502 subsequently attempts to retrieve the result of transaction A, the processing unit 50 is unnecessarily locked by the NAP 508 because the corresponding channel ID 512 is now locked for transaction B. For example, in an example scenario, the processing unit 502 initiates a transaction A and receives, from the NAP 508, a channel ID 512 (e.g., the channel ID 512b) assigned to the transaction A. The transaction manager 510 locks the channel ID 512b assigned to the transaction A, in this scenario. Then, when a result of transaction A is received by the PPN 500 and is written to the data memory 506, the transaction manager 510 releases the channel ID 512b and then reassigns the channel ID 512b to a transaction B subsequently initiated by the processing unit 502. The transaction manager 510 then locks the channel ID 512b to indicate that a result of the second transaction is not available for retrieval from the data memory 506, in an embodiment. Then, at a later time, when the processing unit 502 attempts to retrieve the result of the transaction A, the NAP 508 locks the processing unit 502 based on the current status of the channel ID 512a, although the result of the first processing operation is available for retrieval from the data memory 506, in this example scenario.

In some embodiments, to reduce the chance of such situations or to eliminate such situations, the transaction manager 512 includes a number of channel IDs 512 that exceeds the number of channels 509 in the NAP 508 and, accordingly, exceeds the number of concurrently pending transactions initiated by the processing unit 502. For example, the NAP 508 includes X channels 509, and accordingly supports X concurrently pending transactions initiated by the processing unit 502, and the transaction manager 510 includes N*X channel IDs 512, in an example embodiment. Having a number of channel IDs 512 that exceeds the number of channels 509 increases the amount of time (e.g., the number of clock cycles) between the time that a channel ID 512 is released by the transaction manager 512 and the time that the channel ID 512 is reassigned to a subsequent transaction initiated by the processing unit 502. In at least some embodiments, having a number of channel IDs 512 that exceeds the number of channels 509 reduces or eliminates the chance that the processing unit 502 has not yet requested the result of a first transaction, to which a channel ID 512 when the channel ID 512 corresponding to the first transaction is reassigned to a second transaction.

In some embodiments, one of the channel IDs 512 (e.g., the CH-IDO) is reserved for "non-lock" retrieval of data from the data memory 506. In this embodiment, the reserved channel ID is not assigned to transactions, and the status 514 corresponding to the reserved channel ID 512 is set to "available." To initiate a non-lock retrieval of data from a memory location in the data memory 506, the processing unit 502 issues a load command to the NAP 508, wherein the load command includes the reserved channel ID and the address of the memory location in the address field of the load command, in an embodiment. Because the status of the reserved channel ID 512 in the transaction manager 510 indicates that the channel ID is available, when the NAP 508 receives the load command, the NAP 508 initiates the transfer of data from the memory location indicated by the load command to the processing unit 502 during the same clock cycle as receiving the load command, without locking the processing unit 502, in an embodiment.

In some embodiments, the NAP 508 supports a polling mode, in addition to or instead of the modes in which the processing unit 502 attempts to retrieve results of particular transaction. In the polling mode, rather than attempting to retrieve a result of a particular pending transaction, the processing unit 502 polls the status of locked channel IDs 512 corresponding to the pending transactions to determine when one of the channels IDs 512 is released. When it is determined that one of the locked channel IDs 512 is released, the processing unit 502 retrieves the result of the corresponding transaction from the data memory 506, in an embodiment. The processing unit 502 then continues processing of the packet based on the result of the transaction, in an embodiment, in an embodiment.

Figure 6:
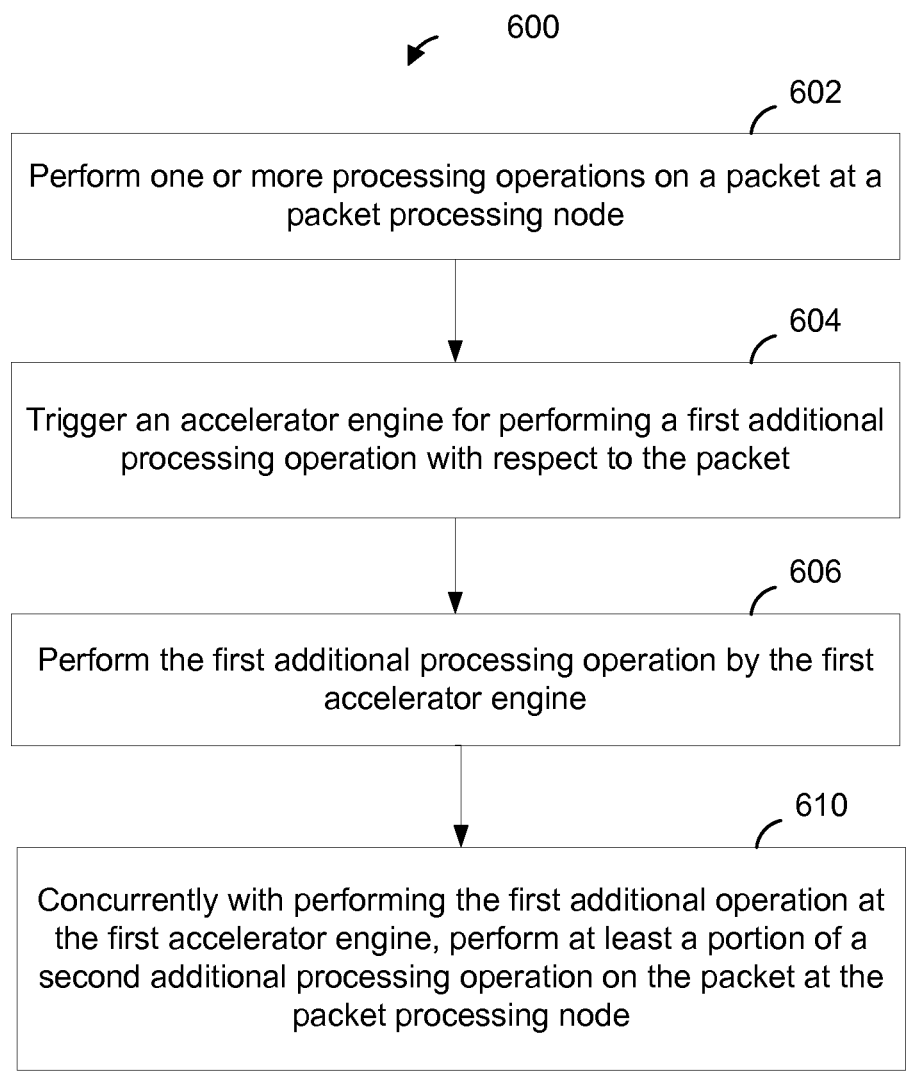
FIG. 6 is a flow diagram of an example method for processing a packet in a network device, according to an embodiment.

FIG. 6 is a flow diagram of an example method 600 for processing packets in a network device that includes at least one packet processing node and a plurality of accelerator engines, according to an embodiment. The method 600 is implemented by the network device 100 of FIG. 1, in an embodiment. In other embodiments, the method 600 is implemented by another suitable network device.

At block 602, a packet processing node performs one or more processing operations on a packet. In an embodiment, the packet processing node is configured to perform multiple different packet processing operations, including at least a first packet processing operation and a second packet processing node, the second packet processing operation being different from the first packet processing operation.

At block 604, the packet processing node triggers an accelerator engine for performing a first additional processing operation with respect to the packet. In an embodiment, the first additional processing operation constitutes an operation different from the multiple processing operations that the packet processing node is configured to perform.

At block 606, the first additional operation is performed with respect to the packet by the accelerator engine triggered at block 604. At block 610, concurrently with performing, at block 606, the first additional processing operation with respect to the packet at the accelerator engine triggered at block 604, the packet processing node performs at least a portion of a second additional processing operation on the packet. The second additional processing operation is independent of a result of the first additional processing operation, in an embodiment.

FIG. 7 is a flow diagram of an example method 700 for processing packets in a network device that includes at least one packet processing node and a plurality of accelerator engines, according to an embodiment. The method 700 is implemented by the network device 100 of FIG. 1, in an embodiment. In other embodiments, the method 700 is implemented by another suitable network device.

At block 702, a processing unit of the packet processing node initiates a transaction with an accelerator engine to trigger the accelerator engine for performing a first processing operation with respect to a packet. At block 704, the accelerator engine is triggered for performing the processing operation corresponding to the transaction initiated at block 702.

At block 706, the processing unit attempts to retrieve a result of the processing operation from a memory location at which the result is supposed to be written when the result is received, at the processing node, from the accelerator engine triggered at block 704. At block 708, in response to the attempt to retrieve the result of the processing operation at block 706, it is determined whether the result of the processing operation is available for retrieval by the processing unit. For example, it is determined at block 708 whether the result of the processing operation has been written to the memory location.

If it is determined at block 708 that the result is available for retrieval by the processing unit, the method continues to block 710, at which retrieval of the result by the processing unit is initiated. On the other hand, when it is determined at block 708 that the result is not available for retrieval by the processing unit, such as when the result has not yet been written to the memory location, for example because the result has not yet been received from the accelerator engine triggered at block 704, the method continues to block 712, at which the processing unit is locked. In an embodiment, the processing unit is locked at block 712 until at least a portion of the result is available for retrieval by the processing unit. Then, when at least a portion of the result becomes available for retrieval by the processing unit, such as when at least a portion of the result is received by the packet processing node and is written to the memory location, retrieval of the result is initiated at block 714.

In an embodiment, a method for processing packets in a network device that includes at least one packet processing node and a plurality of accelerator engines includes performing one or more processing operations with respect to a packet at a packet processing node. the packet processing node being configured to perform multiple different processing operations with respect to the packet. The method also includes triggering a first accelerator engine for performing a first additional processing operation with respect to the packet, wherein the first additional processing operation constitutes an operation that is different from the multiple different processing operations that the packet processing node is configured to perform. The method further includes performing the first additional processing operation by the first accelerator engine. The method additionally includes concurrently with performing the first additional processing operation at the first accelerator engine, performing at least a portion of a second additional processing operation with respect to the packet by the packet processing node, wherein the second additional processing operation is not dependent on a result of the first additional processing operation.

In other embodiments, the method includes any one of, or any combination of one or more of, the following features.

The method further includes before the first additional processing operation is completed by the first accelerator engine, triggering a second accelerator engine for performing a third additional processing operation with respect to the packet, wherein the third additional processing operation constitutes an operation that is different from the multiple different processing operations that the packet processing node is configured to perform.

The method further includes performing the third additional processing operation on the packet by the second processing engine, including performing at least a portion of the third additional processing operation concurrently with performing at least a portion of the first additional processing operation by the first accelerator engine.

The method further includes after performing the at least the second additional processing operation with respect to the packet, suspending processing of the packet at the packet processing node when no additional processing with respect to the packet can be performed at the packet processing node without a result of the first additional processing operation.

The method further includes receiving, at the packet processing node from the first accelerator engine, the result of the first additional processing operation, in response to receiving the result of the first additional processing operation, resuming processing of the packet by the packet processing node, and performing one or more further processing operations with respect to the packet at the packet processing node based on the result of the first additional processing operation.

The packet processing node includes a processing unit configured to execute computer readable instructions stored in a non-transitory memory.

Triggering the first accelerator engine for performing the first additional processing operation with respect to the packet includes issuing a load command by the processing unit, wherein the load command (i) provides an indication of the first additional processing operation and (ii) requests a channel identifier (ID) corresponding to a channel used to conduct a transaction with the first accelerator engine for performing the first additional processing operation, in response to issuing the load command, loading, at the processing unit, the channel identifier (ID) corresponding to the channel used to conduct a transaction with the first accelerator engine, and locking the channel ID to indicate that a result of the first additional processing operation is not available for retrieval by the processing unit.

The load command includes, in an address field of the load command, an identifier corresponding to an entry in a profile table, wherein the entry in the profile table includes information for generating a request to the first accelerator engine.

Triggering the first accelerator engine further includes accessing the profile table based on the identifier corresponding to the entry in the profile table, retrieving, from the entry of the profile table, information for generating the request to the first accelerator engine, generating the request based on the retrieved information, and sending the request to the first accelerator engine.

The method further includes receiving, at the packet processing node, the result of the first processing operation performed by the first accelerator engine, and in response to receiving the result of the first additional processing operation, releasing the channel ID to indicate that the result of the first additional processing operation is available for retrieval by the processing unit.

The entry in the profile table further includes an address of a memory location for storing the result of the first processing operation, and wherein the method further comprises writing the result of the first additional processing operation to the first memory location.

The load command to initiate triggering of the first accelerator engine is a first load command.

The method further includes issuing, by the processing unit, a second load command to retrieve data from the first memory location, wherein the second load command includes, in an address field of the second load command, (i) the channel ID and (ii) the address of the first memory location, determining whether the channel ID has been released, and when it is determined that the channel ID has been released, causing data from the first memory location to be loaded by the processing unit.

Releasing the channel ID, determining that the channel ID has been released and retrieving at least a portion of the result is performed during a same clock cycle.

In another embodiment, a network device comprises a plurality of network ports configured to receive and to transmit packets on a network. The network device also comprises at least one packet processing node configured to perform multiple different packet processing operations with respect to the packets. The network device further comprises a plurality of accelerator engines, including at least a first accelerator engine configured to perform a first additional processing operation, wherein the first additional processing operation constitutes an operation that is different from the multiple different processing operations that the packet processing node is configured to perform. The at least one packet processing node is configured to perform one or more processing operations on a packet, trigger the first accelerator engine for performing the first additional processing operation with respect to the packet, and perform at least a portion of a second additional processing operation with respect to the packet concurrently with the first processing operation performed with respect to the packet by the first accelerator engine, wherein the second additional processing operation is not dependent on a result of the first additional processing operation.

In other embodiments, the network device comprise any one of, or any combination of one or more of, the following features.

The packet processing node is further configured to before the first additional processing operation is completed by the first accelerator engine, trigger a second accelerator engine, of the plurality of accelerator engines, for performing a third additional processing operation on the packet, wherein the third additional processing operation constitutes an operation that is different from the multiple different processing operations that the packet processing node is configured to perform.

At least a portion of the third additional processing operation is performed by the second accelerator engine concurrently with at least a portion of the first additional processing operation performed by the first accelerator engine.

The packet processing node is further configured to, after performing the at least the second additional processing operation with respect to the packet, suspend processing of the packet when no additional processing on the packet can be performed at the packet processing node without a result of the first additional processing operation.

The packet processing node is further configured to receive the result of the first additional processing operation from the first accelerator engine, resume processing of the packet, and perform one or more further processing operations with respect to the packet based on the result of the first additional processing operation.

The packet processing node includes a processing unit configured to execute computer readable instructions stored in a non-transitory memory.

The packet processing node is configured to initiate triggering of the first accelerator engine by issuing a load command from the processing unit, wherein the load command (i) provides an indication of the first additional processing operation and (ii) requests a channel identifier (ID) corresponding to a channel used to conduct a transaction with the first accelerator engine for performing the first additional processing operation, in response to issuing the load command, load, at the processing unit, the channel identifier (ID) corresponding to the channel used for conducting a transaction with the first accelerator engine for performing the first additional processing operation, and lock the channel ID to indicate that the result of the first additional processing operation is not available for retrieval by the processing unit.

The load command issued by the processing unit includes, in an address field of the load command, an identifier corresponding to an entry in a profile table, wherein the entry in the profile table includes information for generating a request to the first accelerator engine.

Triggering the first accelerator engine for performing the first additional processing operation on the packet includes accessing the profile table based on the identifier corresponding to the entry in the profile table, retrieving, from the entry of the profile table, information for generating the request to the first accelerator engine, generating the request based on the retrieved information, and sending the request to the first accelerator engine.

The packet processing node is further configured to receive the result of the first processing operation performed by the first accelerator engine, and in response to receiving the result of the first processing operation, release the channel ID to indicate that the result of the first additional processing operation is available for retrieval by the processing unit.

The entry in the profile table further includes an address of a memory location for storing the result of the first processing operation, and wherein the packet processing node is further configured to write the result of the first processing operation to the first memory location.

The load command to initiate triggering of the first accelerator engine is a first load command.

The processing unit is further configured to issue, a second load command to retrieve data from the first memory location, wherein the second load command includes, in an address field of the second load command, (i) the channel ID and (ii) the address of the first memory location.

The packet processing node is further configured to determine whether the channel ID has been released, and when it is determined that the channel ID has been released, cause data from the first memory location to be loaded to the processing unit.

The packet processing node is configured to (i) release the channel ID, (ii) determine that the channel ID has been released and (iii) cause data from the first memory location to be loaded to the processing unit during a same clock cycle.

In yet another embodiment, a method for processing packets in a network device that includes at least one packet processing node and a plurality of accelerator engines includes initiating, by a processing unit of the packet processing node, a transaction with a first accelerator engine to trigger the first accelerator engine for performing a first processing operation with respect to a packet. The method also includes triggering the first accelerator engine for performing the first processing operation with respect to the packet. The method further includes attempting to retrieve a result of the first processing operation from a first memory location to which the result of the first processing operation is expected to be written when the result of the first processing operation is received from the first accelerator engine. The method additionally includes in response to attempting to retrieve the result from the first memory location determining whether the result has been written to the first memory location. When it is determined that the result has been written to the first memory location, the method includes initiating retrieval of the result by the processing unit from the first memory location. When it is determined that the result has not yet been written to the first memory location, the method includes locking the processing unit until at least a portion of the result is written to the first memory location, and when at least the portion of the result has been written to the first memory location, initiating retrieval of the result by the processing unit from the first memory location.

In other embodiments, the method includes any one of, or any combination of one or more of, the following features.

Triggering the first accelerator engine for performing the first processing operation includes assigning a first channel identifier (ID) with the first transaction, the first channel ID corresponding to a channel used for conducting the first transaction, and locking the first channel ID to indicate that the result of the first processing operation has not yet been written to the memory location.

The method further includes receiving the result of the first processing operation from the first accelerator engine, writing the result of the first processing operation to the first memory location, and releasing the first channel ID to indicate that the result of the first processing operation has been written to the first memory location.

Attempting to retrieve the result of the first processing operation from the first memory location includes issuing a load command, wherein the load command includes, in an address field of the load command, (i) the first channel ID and (ii) an address of the first memory location, and determining that the result has been written to the first memory location comprises obtaining the first channel ID from the address field of the load command and making the determination based on the obtained first channel ID.

Determining that the result of the first processing operation has been written to the first memory location comprises determining that a status of the first channel ID indicates that the result of the first processing operation is available for retrieval by the processing unit.

Determining that the result of the first processing operation has been written to the first memory location and initiating retrieval of the result from the first memory location is performed during a same clock cycle.

The method further includes initiating a second transaction with a second accelerator engine for performing a second processing operation, the second processing operation being different from the multiple processing operations that the packet processing node is configured to perform, and triggering the second accelerator engine for performing the second processing operation with respect to the packet, wherein attempting to retrieve the result of the first processing operation is performed after triggering the second accelerator engine for performing the second processing operation.

The method further includes attempting to retrieve a result of the second processing operation from a memory location to which the result of the second processing operation is expected to be written when the result of the second processing operation is received from the second accelerator engine, including attempting to retrieve the result of the second processing operation before attempting to retrieve the result of the first processing operation, and in response to attempting to retrieve the result of the second processing operation from the second memory location determining whether the result of the second processing operation has been written to the second memory location, and when it is determined that the result has been written to the second memory location, initiating retrieval of the result from the second memory location, and when it is determined that the result has not yet been written to the second memory location, locking the processing unit until at least a portion of the result of the second processing operation is written to the second memory location, and subsequently, when at least the portion of the result of the second processing operation has been written to the second memory location, initiating retrieval of the result of the second processing operation by the processing unit from the second memory location.

Locking the processing unit until at least a portion of the result is written to the first memory location comprises locking the processing unit until an entire result has been written to the memory location.

Locking the processing unit until at least a portion of the result is written to the first memory location comprises locking the processing unit until only a first segment, of multiple segments, of the result has been written to the memory location.

In still another embodiment, a network device comprises a plurality of network ports configured to receive and to transmit packets on a network. The network device also comprises at least one packet processing node configured to perform multiple different packet processing operations with respect to the packets. The network device additionally comprises a plurality of accelerator engines, including at least a first accelerator engine configured to perform a first processing operation, wherein the first processing operation constitutes an operation that is different from the multiple different processing operations that the packet processing node is configured to perform. The packet processing node includes a processing unit configured to initiate a first transaction to a first accelerator engine for performing the first processing operation on a packet, and subsequently to initiating the first transaction, attempt to retrieve a result of the first processing operation from a first memory location to which the result of the first processing operation is expected to be written when the result of the first processing operation is received from the first accelerator engine. The packet processing node is configured to cause the first accelerator engine to be triggered for performing the first processing operation with respect to the packet. The packet processing node is also configured to subsequently to causing the first accelerator engine to be triggered for performing the first processing operation and in response to the attempt, by the processing unit, to retrieve the result of the first processing operation determine whether the result has been written to the first memory location. The packet processing node is further configured to, when it is determined that the result has been written to the first memory location, initiate retrieval of the result by the processing unit from the first memory location, and when it is determined that the result has not yet been written to the first memory location, lock the processing unit until at least a portion of the result is written to the first memory location, and subsequently, when at least the portion of the result has been written to the first memory location, initiate retrieval of the result by the processing unit from the first memory location.

In other embodiments, the network device comprise any one of, or any combination of one or more of, the following features.

The packet processing node is further configured to assign, to the first processing operation, a channel identifier (ID) corresponding to a channel used for conducting the first transaction, and lock the first channel ID to indicate that the result of the first processing operation has not yet been written to the memory location.

The packet processing node is further configured to receive the result of the first processing operation from the first accelerator engine, write the result of the first processing operation to the memory location, and release the first channel ID to indicate that the result of the first processing operation is available for retrieval by the processing unit.

The processing unit is configured to attempting to retrieve the result of the first processing operation from the first memory location at least by issuing a load command, wherein the load command includes, in an address field, (i) the first channel ID and (ii) an address of the memory location.

The packet processing node is configured to obtain the first channel ID from the address field of the load command, and determine that the result has been written to the memory location based on the obtained channel ID.

The packet processing node is configured to determine that the result has been written to the memory location based on the obtained channel ID at least by determining that a status of the first channel ID indicates that the result of the first processing operation is available for retrieval by the processing unit.

Determining that the result of the first processing operation has been written to the memory location and initiating retrieval of the result from the memory location is performed during a same clock cycle.

The processing unit is further configured to initiate a second transaction with a second accelerator engine among the plurality of accelerator engines, the second transaction for a second processing operation to be performed with respect to the packet by the second accelerator engine.

The packet processing node is further configured to cause the second accelerator engine to be triggered for performing the second processing operation with respect to the packet.

Attempting to retrieve the result of the first processing operation is performed after triggering the second accelerator engine for performing the second processing operation.

The processing unit is further configured to before attempting to retrieve the result of the first processing operation, attempt to retrieve a result of the second processing operation from a second memory location to which the result of the second processing operation is expected to be written when the result of the second processing operation is received from the second accelerator engine.

The packet processing node is configured to in response to the attempt, by the processing unit, to retrieve the result of the second processing operation from the second memory location determine whether the result of the second processing operation has been written to the second memory location, and when it is determined that the result has been written to the second memory location, initiate retrieval of the result from the second memory location, and when it is determined that the result has not yet been written to the second memory location, lock the processing unit until at least a portion of the result of the second processing operation is written to the memory location, and subsequently, when at least the portion of the result of the second processing operation has been written to the second memory location, initiate retrieval of the result of the second processing operation from the second memory location.

The packet processing node is configured to, when it is determined that the result of the first processing operation has not yet been written to the first memory location, lock the processing unit until the entire result of the first processing operation has been written to the memory location.

Locking the processing unit until at least a portion of the result is written to the memory location comprises locking the processing unit until only a first segment, of multiple segments, of the result has been written to the memory location.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium or media such as a magnetic disk, an optical disk, a RAM or ROM or flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for processing packets in a network device that includes at least one packet processing node and a plurality of accelerator engines, the method comprising:
    initiating, by a processing unit of the packet processing node, a transaction with a first accelerator engine to trigger the first accelerator engine for performing a first processing operation with respect to a packet, triggering the first accelerator engine for performing the first processing operation with respect to the packet;
attempting to retrieve a result of the first processing operation from a first memory location to which the result of the first processing operation is expected to be written when the result of the first processing operation is received from the first accelerator engine; and
in response to attempting to retrieve the result from the first memory location:
determining whether the result has been written to the first memory location, and
when it is determined that the result has been written to the first memory location, initiating retrieval of the result by the processing unit from the first memory location, and
when it is determined that the result has not yet been written to the first memory location
locking the processing unit until at least a portion of the result is written to the first memory location, and
when at least the portion of the result has been written to the first memory location, initiating retrieval of the result by the processing unit from the first memory location.

2. The method of claim 1, wherein:
triggering the first accelerator engine for performing the first processing operation includes assigning a first channel identifier (ID) with the first transaction, the first channel ID corresponding to a channel used for conducting the first transaction, and
locking the first channel ID to indicate that the result of the first processing operation has not yet been written to the memory location.

3. The method of claim 2, further comprising
receiving the result of the first processing operation from the first accelerator engine,
writing the result of the first processing operation to the first memory location, and
releasing the first channel ID to indicate that the result of the first processing operation has been written to the first memory location.

4. The method of claim 2, wherein
attempting to retrieve the result of the first processing operation from the first memory location includes issuing a load command, wherein the load command includes, in an address field of the load command, (i) the first channel ID and (ii) an address of the first memory location, and
determining that the result has been written to the first memory location comprises obtaining the first channel ID from the address field of the load command and making the determination based on the obtained first channel ID.

5. The method of claim 4, wherein determining that the result of the first processing operation has been written to the first memory location comprises determining that a status of the first channel ID indicates that the result of the first processing operation is available for retrieval by the processing unit.

6. The method of claim 4, wherein (i) determining that the result of the first processing operation has been written to the first memory location and (ii) initiating retrieval of the result from the first memory location is performed during a same clock cycle.

7. The method of claim 1, further comprising:
initiating a second transaction with a second accelerator engine for performing a second processing operation, the second processing operation being different from the multiple processing operations that the packet processing node is configured to perform, and
triggering the second accelerator engine for performing the second processing operation with respect to the packet, wherein attempting to retrieve the result of the first processing operation is performed after triggering the second accelerator engine for performing the second processing operation.

8. The method of claim 7, further comprising attempting to retrieve a result of the second processing operation from a memory location to which the result of the second processing operation is expected to be written when the result of the second processing operation is received from the second accelerator engine, including attempting to retrieve the result of the second processing operation before attempting to retrieve the result of the first processing operation, and
in response to attempting to retrieve the result of the second processing operation from the second memory location:
determining whether the result of the second processing operation has been written to the second memory location, and
when it is determined that the result has been written to the second memory location, initiating retrieval of the result from the second memory location, and
when it is determined that the result has not yet been written to the second memory location
locking the processing unit until at least a portion of the result of the second processing operation is written to the second memory location, and
subsequently, when at least the portion of the result of the second processing operation has been written to the second memory location, initiating retrieval of the result of the second processing operation by the processing unit from the second memory location.

9. The method of claim 1, wherein locking the processing unit until at least a portion of the result is written to the first memory location comprises locking the processing unit until an entire result has been written to the memory location.

10. The method of claim 1, wherein locking the processing unit until at least a portion of the result is written to the first memory location comprises locking the processing unit until only a first segment, of multiple segments, of the result has been written to the memory location.

11. A network device, comprising
a plurality of network ports configured to receive and to transmit packets on a network;
at least one packet processing node configured to perform multiple different packet processing operations with respect to the packets, and
a plurality of accelerator engines, including at least a first accelerator engine configured to perform a first processing operation, wherein the first processing operation constitutes an operation that is different from the multiple different processing operations that the packet processing node is configured to perform,
wherein the packet processing node includes a processing unit configured to:
initiate a first transaction to a first accelerator engine for performing the first processing operation on a packet, and
subsequently to initiating the first transaction, attempt to retrieve a result of the first processing operation from a first memory location to which the result of the first processing operation is expected to be written when the result of the first processing operation is received from the first accelerator engine; and wherein the packet processing node is configured to
cause the first accelerator engine to be triggered for performing the first processing operation with respect to the packet, and
subsequently to causing the first accelerator engine to be triggered for performing the first processing operation and in response to the attempt, by the processing unit, to retrieve the result of the first processing operation:
determine whether the result has been written to the first memory location, and
when it is determined that the result has been written to the first memory location, initiate retrieval of the result by the processing unit from the first memory location, and
when it is determined that the result has not yet been written to the first memory location
lock the processing unit until at least a portion of the result is written to the first memory location, and
subsequently, when at least the portion of the result has been written to the first memory location, initiate retrieval of the result by the processing unit from the first memory location.

12. The network device of claim 11, wherein the packet processing node is further configured to
assign, to the first processing operation, a channel identifier (ID) corresponding to a channel used for conducting the first transaction, and
lock the first channel ID to indicate that the result of the first processing operation has not yet been written to the memory location.

13. The network device of claim 12, wherein the packet processing node is further configured to
receive the result of the first processing operation from the first accelerator engine,
write the result of the first processing operation to the memory location, and
release the first channel ID to indicate that the result of the first processing operation is available for retrieval by the processing unit.

14. The network device of claim 12, wherein
the processing unit is configured to attempting to retrieve the result of the first processing operation from the first memory location at least by issuing a load command, wherein the load command includes, in an address field, (i) the first channel ID and (ii) an address of the memory location, and
the packet processing node is configured to
obtain the first channel ID from the address field of the load command, and
determine that the result has been written to the memory location based on the obtained channel ID.

15. The network device of claim 14, wherein the packet processing node is configured to determine that the result has been written to the memory location based on the obtained channel ID at least by determining that a status of the first channel ID indicates that the result of the first processing operation is available for retrieval by the processing unit.

16. The network device of claim 14, wherein (i) determining that the result of the first processing operation has been written to the memory location and (ii) initiating retrieval of the result from the memory location is performed during a same clock cycle.

17. The network device of claim 11, wherein:
the processing unit is further configured to initiate a second transaction with a second accelerator engine among the plurality of accelerator engines, the second transaction for a second processing operation to be performed with respect to the packet by the second accelerator engine, and
the packet processing node is further configured to cause the second accelerator engine to be triggered for performing the second processing operation with respect to the packet, and
wherein attempting to retrieve the result of the first processing operation is performed after triggering the second accelerator engine for performing the second processing operation.

18. The network device of claim 17, wherein
the processing unit is further configured to before attempting to retrieve the result of the first processing operation, attempt to retrieve a result of the second processing operation from a second memory location to which the result of the second processing operation is expected to be written when the result of the second processing operation is received from the second accelerator engine, and
the packet processing node is configured to
in response to the attempt, by the processing unit, to retrieve the result of the second processing operation from the second memory location:
determine whether the result of the second processing operation has been written to the second memory location, and
when it is determined that the result has been written to the second memory location, initiate retrieval of the result from the second memory location, and
when it is determined that the result has not yet been written to the second memory location
lock the processing unit until at least a portion of the result of the second processing operation is written to the memory location, and
subsequently, when at least the portion of the result of the second processing operation has been written to the second memory location, initiate retrieval of the result of the second processing operation from the second memory location.

19. The network device of claim 11, wherein the packet processing node is configured to, when it is determined that the result of the first processing operation has not yet been written to the first memory location, lock the processing unit until the entire result of the first processing operation has been written to the memory location.

20. The network device of claim 11, wherein locking the processing unit until at least a portion of the result is written to the memory location comprises locking the processing unit until only a first segment, of multiple segments, of the result has been written to the memory location.

* * * * *